(12) United States Patent
Lan et al.

(10) Patent No.: US 9,042,494 B2
(45) Date of Patent: May 26, 2015

(54) DIGITAL BROADCASTING RECEIVING SYSTEM AND ASSOCIATED SIGNAL PROCESSING METHOD

(71) Applicant: MStar Semiconductor, Inc., Hsinchu Hsien (TW)

(72) Inventors: Ching-Fu Lan, Hsinchu County (TW); Hsin-Chuan Kuo, Hsinchu County (TW); Tung-Sheng Lin, Hsinchu County (TW); Tai-Lai Tung, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 14/200,664

(22) Filed: Mar. 7, 2014

(65) Prior Publication Data

US 2014/0254652 A1    Sep. 11, 2014

(30) Foreign Application Priority Data

Mar. 8, 2013  (TW) .............................. 102108172 A

(51) Int. Cl.
*H03D 1/00* (2006.01)
*H04L 27/06* (2006.01)
*H04L 27/26* (2006.01)
*H04L 25/06* (2006.01)
*H04L 27/38* (2006.01)

(52) U.S. Cl.
CPC ........ *H04L 27/2656* (2013.01); *H04L 27/2672* (2013.01); *H04L 27/2675* (2013.01); *H04L 25/067* (2013.01); *H04L 27/3881* (2013.01)

(58) Field of Classification Search
CPC .................................................. H04L 27/2656
USPC .................................. 375/343, 150, 151, 143
See application file for complete search history.

(56) References Cited

U.S. PATENT DOCUMENTS 7,356,094 B1 * 4/2008 Ikeda et al. .................... 375/316
8,265,121 B2 * 9/2012 Tokoro et al. ................. 375/142
8,824,528 B2 * 9/2014 Ban et al. ....................... 375/150

OTHER PUBLICATIONS

Nakahara et al, "Efficient Use of Frequencies in Terrestrial ISDB System", IEEE, Transactions on Broadcasting; vol. 42, pp. 173-178; No. 3 Sep. 1996.*

*Primary Examiner* — Qutbuddin Ghulamali
(74) *Attorney, Agent, or Firm* — WPAT, PC; Justin King

(57) ABSTRACT

A digital broadcasting receiving system is provided. A receiving module receives an M number of symbols each carrying an N number of subcarriers of a control signal. A converting module performs FFT on respective $k^{th}$ subcarriers of an $i^{th}$ symbol and an $(i+1)^{th}$ symbol to generate an $(i, k)^{th}$ converted value and an $(i+1, k)^{th}$ converted value. A demodulating module performs differential demodulation on the $(i, k)^{th}$ and $(i+1, k)^{th}$ converted values to generate an $(i, k)^{th}$ demodulation value. A combining module soft-combines the $(i, 1)^{th}$ demodulation value through the $(i, N)^{th}$ demodulation value to generate an $i^{th}$ prediction value corresponding to the $i^{th}$ symbol. A determining module identifies a synchronization segment in the control signal according to the $1^{st}$ prediction value to the $(M-1)^{th}$ prediction value.

13 Claims, 2 Drawing Sheets

DIGITAL BROADCASTING RECEIVING SYSTEM AND ASSOCIATED SIGNAL PROCESSING METHOD

This application claims the benefit of Taiwan application Serial No. 102108172, filed Mar. 8, 2013, the subject matter of which is incorporated herein by reference.

BACKGROUND OF THE INVENTION

1. Field of the Invention

The invention relates in general to a digital broadcasting technology, and more particularly, to a system and method for identifying a synchronization segment included in a control signal carried by multiple subcarriers in a digital broadcasting system.

2. Description of the Related Art

With progress in communication technologies, digital television broadcasting has also matured. In addition to being transmitted via cable wires, digital television signals may also be transmitted as wireless signals through equipments such as base stations or satellites. Integrated services digital broadcasting terrestrial (ISDB-T) is currently a prevelent standard in the field of digital television broadcasting.

Each data frame in an ISDB-T signal includes 204 orthogonal frequency division multiplexing (OFDM) symbols, each of which includes content bits carried by multiple subcarriers. According to ISDB-T specifications, a transmission and multiplexing configuration control (TMCC) subcarrier is for transmitting information including modulation types, encoding rates, scrambling lengths and multiplexing schemes for the reference of a receiver. In other words, one or multiple subcarriers in each symbol are dedicated for carrying the TMCC signal, and each TMCC subcarrier in each data frame carries 204 bits of information. In the 204 bits of information, the $2^{nd}$ bit to the $17^{th}$ bit (with a total of 16 bits) are defined as a synchronization segment.

Before decoding a received data stream, an ISDB-T receiver needs to first identify the synchronization segment in the TMCC signal in order to locate boundaries between data frames and to further determine positions and contents of TMCC information. The contents of the synchronization segment can only be one of two standard sequences— 0011010111101110 and 1100101000010001. In the prior art, an ISDB-T receiver monitors whether a specific TMCC subcarrier in an input stream contains contents that match either of the above sequences. To enhance accuracy, after finding a matching 16-bit sequence, the ISDB-T receiver further determines whether another matching sequence is present at an interval of 204 bits. Only after having identified multiple successive matching sequences, the ISDB-T receiver performs a decoding procedure on the TMCC information. However, a setback of the above approach is that the ISDB-T receiver requires a long monitoring period before being able to locate the positions of the boundaries, such that a user of the ISDB-T receiver can only view contents provided by the transmitter after a long waiting period subsequent to boot-on.

SUMMARY OF THE INVENTION

The invention is directed to a receiving system and an associated signal processing method. By soft-combining symbol prediction values generated from a control signal carried by multiple subcarriers, without involving lengthy monitoring periods for an input stream, the receiving system and the associated signal processing method yield prediction results of higher reliability for locating boundaries of data frames.

According to an embodiment of the present invention, a digital broadcasting receiving system is provided. The digital broadcasting receiving system includes a receiving module, a converting module, a differential demodulation module, a combining module and a determining module. The receiving module receives an M number of symbols included in a section under test. Each of the M number of symbols includes an N number of subcarriers carrying a control signal. M and N are integers greater than 1. The converting module performs fast Fourier transform (FFT) on respective $k^{th}$ subcarriers of an $i^{th}$ symbol and an $(i+1)^{th}$ symbol of the M number of symbols to generate an $(i, k)^{th}$ converted value and an $(i+1, k)^{th}$ converted value. The $k^{th}$ subcarriers are included in the N number of subcarriers, i is an integral index ranging from 1 to (M−1), and k is an integral index ranging from 1 to N. The differentiation demodulation module performs differential demodulation on the $(i, k)^{th}$ and $(i+1, k)^{th}$ converted values to generate an $(i, k)^{th}$ demodulation value. The combining module soft-combines the $(i, 1)^{th}$ demodulation value through the $(i, N)^{th}$ demodulation value to generate an $i^{th}$ prediction value corresponding to the $i^{th}$ symbol. The determining module identifies a synchronization segment in the control signal according to the $1^{st}$ prediction value to the $(M-1)^{th}$ prediction value.

According to another embodiment of the present invention, a signal processing method applied to a digital broadcasting system is provided. The method includes the following steps. An M number of symbols included in a section under test are received. Each of the M number of symbols includes an N number of subcarriers carrying a control signal. M and N are integers greater than 1. FFT is performed on respective $k^{th}$ subcarriers of an $i^{th}$ symbol and an $(i+1)^{th}$ symbol of the M number of symbols to generate an $(i, k)^{th}$ converted value and an $(i+1, k)^{th}$ converted value. The $k^{th}$ subcarriers are included in the N number of subcarriers, i is an integral index ranging from 1 to (M−1), and k is an integral index ranging from 1 to N. Differential demodulation is performed on the $(i, k)^{th}$ and $(i+1, k)^{th}$ converted values to generate an $(i, k)^{th}$ demodulation value. The $(i, 1)^{th}$ demodulation value through the $(i, N)^{th}$ demodulation value are soft-combined to generate an $i^{th}$ prediction value corresponding to the $i^{th}$ symbol. A synchronization segment in the control signal is identified according to the $1^{st}$ prediction value to the $(M-1)^{th}$ prediction value.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
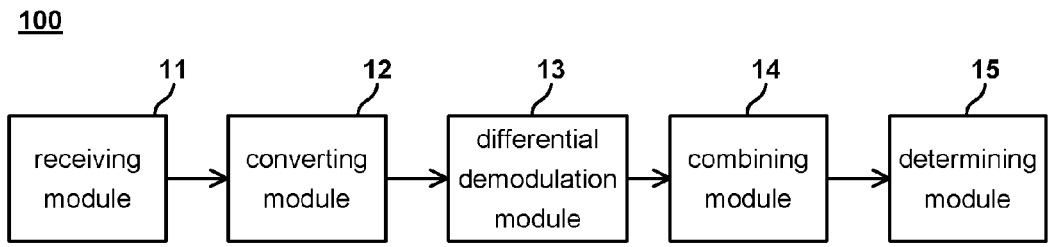
FIG. 1 is a block diagram of an ISDB-T system according to an embodiment of the present invention.

FIG. 1 shows a block diagram of an integrated services digital broadcasting terrestrial (ISDB-T) receiving system according to an embodiment of the present invention. Referring to FIG. 1, an ISDB-T receiving system 100 includes a receiving module 11, a converting module 12, a differential demodulation module 13, a combining module 14, and a determining module 15. In practice, the number of TMCC subcarriers changes with a transmission mode adopted by the ISDB-T system. Under most circumstances, each symbol includes multiple TMCC subcarriers. The ISDB-T receiving system 100 of the present invention is particularly suitable for the above situation.

Figure 2:
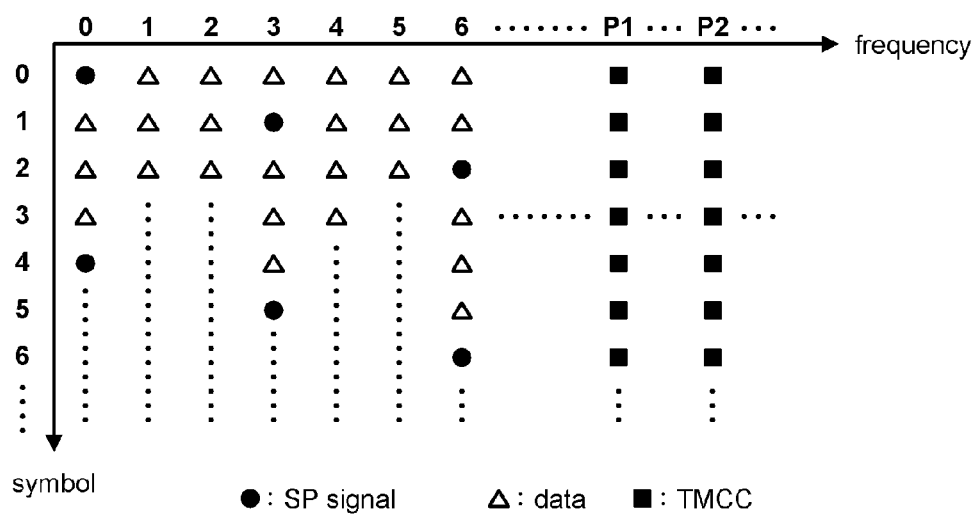
FIG. 2 is an exemplary content configuration of an ISDB-T signal.

FIG. 2 shows an exemplary content configuration of an ISDB-T signal, with the horizontal axis representing the frequency and the vertical axis representing the symbol number (the greater the number, the later the time of transmission). As shown in FIG. 2, subcarriers at frequency indices of multiples of 3 (e.g., 0, 3, 6, 9 . . . ) carry a scatter pilot (SP) signal at a predetermined interval, and subcarriers at frequency indices of P1 and P2 are TMCC subcarriers.

The receiving module 11 receives an M number of symbols included in a section under test. Each of the M number of symbols includes an N number of subcarriers for carrying a TMCC signal. M and N are integers greater than 1. Taking FIG. 2 for example, the M number of symbols may be 17 symbols numbered 0 to 16 (M=17), and each of the symbols at least includes two TMCC subcarriers P1 and P2 (N≥2). In the description below, N=2 is given as an example for one person skilled in the art to understand the present invention, not limiting the present invention.

The converting module 12 performs fast Fourier transformation (FFT) on a $k^{th}$ subcarrier of an $i^{th}$ symbol and a $k^{th}$ subcarrier of an $(i+1)^{th}$ symbol of the M number of symbols to generate an $(i, k)^{th}$ FFT value and an $(i+1, k)^{th}$ FFT value. The $k^{th}$ subcarriers are included in the N number of subcarriers, i is an integral index ranging from 1 to (M−1), and k is an integral index ranging from 1 to N. Next, the differential modulation module 13 performs differential demodulation on the $(i, k)^{th}$ FFT value and the $(i+1, k)^{th}$ FFT value to generate an $(i, k)^{th}$ differential demodulation value. For example, when M=17 and N=2, i=1~16 and k=1~2. The converting module 12 generates an FFT value for the subcarriers P1 and P2 included in the symbols 0 to 17, respectively, and the differential demodulation module 13 generates a total of 32 differential demodulation values according to the 34 FFT values.

The combining module 14 soft-combines the $(i, 1)^{th}$ differential demodulation value through the $(i, N)^{th}$ differential demodulation value to generate an $i^{th}$ prediction value corresponding to the $i^{th}$ symbol. That is to say, when N=2, the prediction value of the $1^{st}$ symbol is generated from soft-combining the $(1, 1)^{th}$ differential demodulation value and the $(1, 2)^{th}$ differential demodulation value, the prediction of the $2^{nd}$ symbol is generated from soft-combining the $(2, 1)^{th}$ differential demodulation value and the $(2, 2)^{th}$ differential demodulation value, and so forth. The determining module 15 then identifies the synchronization segment in the TMCC signal according to the $1^{st}$ prediction value to the $(M-1)^{th}$ prediction value. Taking M=17 for example, the 16 prediction values generated by the combining module 14 may be regarded as a sequence under test, and the determining module 15 may compare the sequence under test with the two standard sequences of the TMCC synchronization segment. When the sequence under test matches the contents of either of the standard sequences, the determining module 15 may determine that the sequence under test is much likely the synchronization segment in the TMCC signal.

When the determining module 15 determines the sequence under test is not the synchronization segment in the TMCC signal, the ISDB-T receiving system 100 may change the region of the section under test, and iterate the similar determination procedure. For example, the receiving system 100 may change to the 17 symbols numbered 1 to 17 as the section under test. It should be noted that, when changing the section under test, the ISDB-T receiving system 100 need not necessarily again generate all the prediction values. For example, if prediction values of 15 symbols numbered 1 to 15 are already obtained in the previous determination procedure, the ISDB-T receiving system 100 only needs to further generate the prediction value of the symbol numbered 16 to obtain the new sequence under test.

As seen from the above description, the prediction values of the bits are obtained by soft-combining the demodulation values generated from multiple TMCC subcarriers, which is different from the conventional solution that monitors only one single TMCC subcarrier. Compared to the prior art, the combining module 14 provides prediction values with higher accuracy. Further, compared to hard combination, soft combination usually yields more ideal prediction accuracy. Proven by simulation experiments, an error rate in the results determined by the determining module 15 gets lower as the number of soft-combined demodulation values gets larger.

In practice, to further enhance overall determination accuracy of the ISDB-T receiving system 100, the ISDB-T receiving system 100 may soft-combine multiple successive determination results of the determining module 15 to generate a final determination result. On the other hand, to reduce hardware complexities of the ISDB-T receiving system 100, the combining module 14, instead of taking both real and imaginary parts of all demodulation values into account, may be designed to soft-combine only a real part of the $(i, 1)^{th}$ differential demodulation value through a real part of the $(i, N)^{th}$ differential demodulation value to generate the $i^{th}$ prediction value.

Based on ISDB-T specifications, phases of the TMCC synchronization segments of two adjacent data frames are inverted. The ISDB-T receiving system of the present invention may employ such characteristic to generate another type of sequence under test. In one embodiment, for an M number of symbols in another section under test, the ISDB-T receiving system 100 further generates an (M−1) number of prediction values as an (M−1) number of comparison values. The starting positions of the two sections under test are spaced by 204 symbols. For example, assuming the first section under test includes 17 symbols numbered 0 to 16, the second section under test then includes 17 symbols numbered 204 to 220. That is to say, when M=17, the combining module 14 generates a total of 32 prediction values, with 16 of which corresponding to the first section under test, and the other 16 corresponding to the second section under test.

It is appreciated that, when the first section under test is the TMCC synchronization segment of a specific data frame, the second section under test is essentially the TMCC synchronization segment of a next data frame and is inverted from the previous TMCC synchronization segment. When noises are omitted, assuming values 1 and −1 represent two possible phases of a signal, by subtracting the corresponding prediction values of the TMCC synchronization segment in two adjacent data frames from one another, the amplitude of the obtained signal is twice of the amplitude of the first TMCC synchronization segment.

In the embodiment, the determining module 15 includes a subtractor and a comparator. The subtractor subtracts the $i^{th}$ comparison value of the (M−1) number of comparison values from the $i^{th}$ prediction value to generate an $i^{th}$ difference value. When M=17, the subtractor generates 16 difference values, which are regarded as the sequence under test. The comparator compares a reference sequence with the sequence under test to determine whether the sequence under test corresponds to the TMCC synchronization segment. In practice, the comparator may perform correlation calculation on the two reference sequences (i.e., the two types of contents of the TMCC synchronization segment) with the sequence under test, respectively, to generate two correlation values. Given either of the correlation values is higher than a threshold, the comparator determines that the $1^{st}$ symbol to the $(M-1)^{th}$ symbol of the M number of symbols correspond to the synchronization segment. The threshold may be determined based on simulations or experiments.

Further, based on ISDB-T specifications, in a data frame, a 3-bit modulation type segment describing whether the data frame is differential modulation or coherent modulation follows the 16-bit TMCC synchronization segment. The modulation types of two adjacent data frames are usually the same. The ISDB-T receiving system according to the present invention may utilize such characteristic to generate another sequence under test having a length of 19 bits. In one embodiment, M is equal to 20, and the ISDB-T receiving system 100 further generates 19 prediction values as 19 comparison values for 20 symbols of another section under test. The starting positions of the two sections under test are spaced by 204 symbols.

Likewise, when noises are omitted, assuming values 1 and −1 represent two possible phases of a signal, by subtracting the corresponding prediction values of the TMCC synchronization segments in two adjacent data frames from one another, the amplitude of the obtained signal is twice of the amplitude of the first TMCC synchronization segment. On the other hand, by adding the prediction values of the TMCC modulation type segments in two adjacent data frames to one another, the amplitude of the obtained signal is twice of the amplitude of the first TMCC modulation type segment.

In the embodiment, the determining module 15 includes a subtractor, an adder and a comparator. For the first 16 prediction values generated by the combining module 14, the subtractor subtracts the $i^{th}$ comparison value of the 19 comparison values from the $i^{th}$ prediction value to generate an $i^{th}$ difference value. For the last three prediction values generated by the combining module 14, the adder adds the $i^{th}$ prediction value to the $i^{th}$ comparison value to generate an $i^{th}$ summation value. The $1^{st}$ difference value to the $16^{th}$ difference value and the $17^{th}$ summation value to the $19^{th}$ summation value form a sequence under test. The comparator compares a reference sequence with the sequence under test to determine whether the $1^{st}$ symbol to the $19^{th}$ symbol of the 20 symbols correspond to the TMCC synchronization segment and the modulation type segment.

In practice, considering two possible types of contents of the TMCC synchronization segment and the two possible types of contents of the modulation type segment (111 or 000), the reference sequence has four possibilities. The comparator may perform correlation calculation on the four reference sequences and the sequence under test, respectively, to generate four correlation values. Given one of the four correlation values is higher than a threshold, the comparator determines that the $1^{st}$ symbol to the $19^{th}$ symbol of the 20 symbols correspond to the TMCC synchronization segment and the modulation type segment.

Regardless of which type of sequence under test is adopted, after locating one or multiple TMCC synchronization segments of an input stream, the ISDB-T receiving system 100 may perform the decoding procedure according to corresponding boundaries to obtain contents of the TMCC signal and other data contents.

Figure 3:
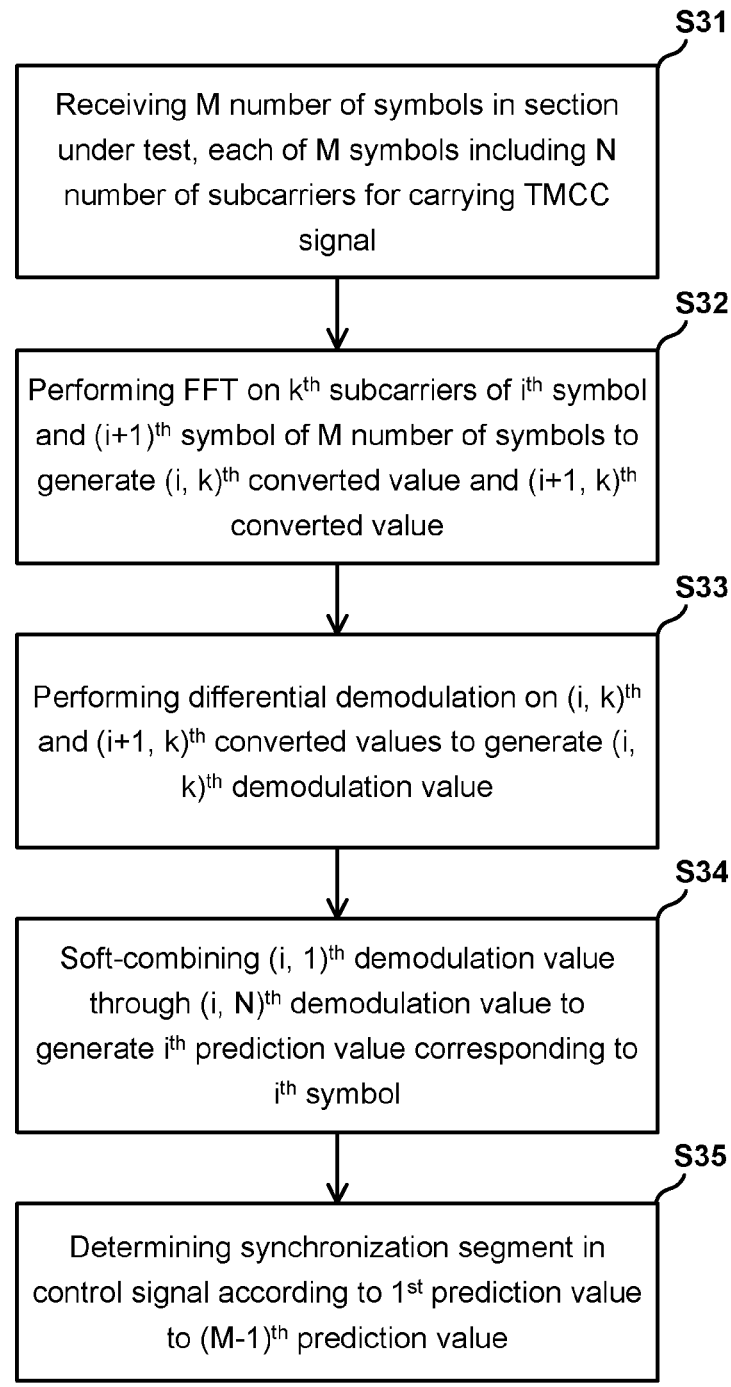
FIG. 3 is a flowchart of a signal processing method according to an embodiment of the present invention.

FIG. 3 shows a flowchart of a signal processing method applied to an ISDB-T receiving system according to another embodiment of the present invention. The method includes the following steps. In step S31, an M number of symbols in a section under test are received. Each of the M number of symbols includes an N number of subcarriers for carrying a TMCC signal. M and N are integers greater than 1. In step S32, FFT is performed on respective $k^{th}$ subcarriers of an $i^{th}$ symbol and an $(i+1)^{th}$ symbol of the M number of symbols to generate an $(i, k)^{th}$ FFT value and an $(i+1, k)^{th}$ FFT value. The $k^{th}$ subcarriers are included in the N number of subcarriers, i is an integral index ranging from 1 to (M−1), and k is an integral index ranging from 1 to N. In step S33, differential demodulation is performed on the $(i, k)^{th}$ and $(i+1, k)^{th}$ FFT values to generate an $(i, k)^{th}$ differential demodulation value. In step S34, the $(i, 1)^{th}$ differential demodulation value through the $(i, N)^{th}$ differential demodulation value are soft-combined to generate an $i^{th}$ prediction value corresponding to the $i^{th}$ symbol. In step S35, a synchronization segment in the control signal is identified according to the $1^{st}$ prediction value to the $(M-1)^{th}$ prediction value.

Various circuit operations and modifications (e.g., the sequences under test with different contents) given in the description associated with the ISDB-T receiving system 10 are applicable to the signal processing method in FIG. 3, and shall be omitted herein.

An ISDB-T receiving system and an associated signal processing method are disclosed by the embodiments of the present invention. By soft-combining symbol prediction values generated from multiple subcarriers, without involving lengthy monitoring periods for an input stream, the receiving system and the associated signal processing method yield prediction results of higher reliability for locating boundaries of data frames.

It should be noted that, in the above description, the ISDB-T specifications are taken as an example for explaining the present invention, not limiting the present invention. For example, the present invention is also applicable to a digital video broadcasting terrestrial (DVB-T) system, and prediction results having higher reliability may be provided by soft-combining symbol prediction values generated from multiple continual pilot (CP) signals.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A digital broadcasting receiving system, comprising:
    a receiving module, configured to receive an M number of symbols comprised in a section under test, each of the M number of symbols comprising an N number of subcarriers carrying a control signal, and M and N being integers greater than 1;
    a converting module, configured to perform fast Fourier transform (FFT) on respective $k^{th}$ subcarriers of an $i^{th}$ symbol and an $(i+1)^{th}$ symbol of the M number of symbols to generate an $(i, k)^{th}$ FFT value and an $(i+1, k)^{th}$ FFT value, the $k^{th}$ subcarriers being comprised in the N number of subcarriers, i being an integral index ranging from 1 to (M−1), and k being an integral index ranging from 1 to N;
    a differential demodulation module, configured to perform differential demodulation on the $(i, k)^{th}$ FFT value and the $(i+1, k)^{th}$ FFT value to generate an $(i, k)^{th}$ differential demodulation value;

a combining module, configured to soft-combine the $(i, 1)^{th}$ differential demodulation value through the $(i, N)^{th}$ differential demodulation value to generate an $i^{th}$ prediction value corresponding to the $i^{th}$ symbol; and a determining module, configured to identify a synchronization segment according to the $1^{st}$ prediction value to an $(M-1)^{th}$ prediction value.

2. The digital broadcasting receiving system according to claim 1, wherein:

for the M number of symbols in another section under test, the digital broadcasting further generates an (M−1) number of prediction values as an (M−1) number of comparison values;

starting positions of the another section under test and the section under test are spaced by a number of symbols comprised in a data frame; and the determining module comprises:

a subtractor, configured to subtract an $i^{th}$ comparison value of the (M−1) number of comparison values from the $i^{th}$ prediction value to generate an $i^{th}$ difference value; and a comparator, configured to compare a reference sequence with a sequence under test formed by the $1^{st}$ difference value to the $(M-1)^{th}$ difference value to determine whether the $1^{st}$ difference value to the $(M-1)^{th}$ difference value correspond to the synchronization segment.

3. The digital broadcasting receiving system according to claim 2, wherein the comparator performs correlation calculation on the reference sequence and the sequence under test to generate a correlation value, and determines that the $1^{st}$ symbol to the $(M-1)^{th}$ symbol of the M number of symbols correspond to the synchronization segment when the correlation value is higher than a threshold.

4. The digital broadcasting receiving system according to claim 1, wherein:

for the M number of symbols in another section under test, the digital broadcasting receiving system further generates an (M−1) number of prediction values as an (M−1) number of comparison values;

starting positions of the another section under test and the section under test are spaced by a number of symbols comprised in a data frame;

the determining module comprises:

a subtractor, configured to subtract an $i^{th}$ comparison value of the (M−1) number of comparison values from the $i^{th}$ prediction value to generate an $i^{th}$ difference value for an i value of a first part;

an adder, configured to add the $i^{th}$ prediction value to the $i^{th}$ comparison value to generate an $i^{th}$ summation value for an i value of a second part; and a comparator, configured to compare a reference sequence with a sequence under test formed by the plurality of difference values and the plurality of summation values to determine whether the $1^{st}$ difference value to the $(M-1)^{th}$ difference value correspond to the synchronization segment.

5. The digital broadcasting receiving system according to claim 4, wherein the comparator performs correlation calculation on the reference sequence and the sequence under test to generate a correlation value, and determines that the $1^{st}$ symbol to the $(M-1)^{th}$ symbol of the M number of symbols correspond to the synchronization segment when the correlation value is higher than a threshold.

6. The digital broadcasting receiving system according to claim 1, wherein the combining module soft-combines a real part of the $(i, 1)^{th}$ differential demodulation value through a real part of the $(i, N)^{th}$ demodulation value to generate the $i^{th}$ prediction value.

7. A signal processing method, applied to a digital broadcasting receiving system comprising a receiving module, a converting module, a differential demodulation module, a combining module and a determining module, comprising:

a) receiving an M number of symbols comprised in a section under test with said receiving module, each of the M number of symbols comprising an N number of subcarriers carrying a control signal, and M and N being integers greater than 1;

b) performing FFT with said converting module on respective $k^{th}$ subcarriers of an $i^{th}$ symbol and an $(i+1)^{th}$ symbol of the M number of symbols to generate an $(i, k)^{th}$ FFT value and an $(i+1, k)^{th}$ FFT value, the $k^{th}$ subcarriers being comprised in the N number of subcarriers, i being an integral index ranging from 1 to (M−1), and k being an integral index ranging from 1 to N;

c) performing differential demodulation with said differential demodulation module on the $(i, k)^{th}$ and $(i+1, k)^{th}$ FFT values to generate an $(i, k)^{th}$ differential demodulation value;

d) soft-combining the $(i, 1)^{th}$ differential demodulation value through the $(i, N)^{th}$ differential demodulation value with said combining module to generate an $i^{th}$ prediction value corresponding to the $i^{th}$ symbol; and e) determining a synchronization segment with said determining module according to the $1^{st}$ prediction value to the $(M-1)^{th}$ prediction value.

8. The signal processing method according to claim 7, wherein:

for the M number of symbols in another section under test, the signal processing method further generates an (M−1) number of prediction values as an (M−1) number of comparison values;

starting positions of the another section under test and the section under test are spaced by a number of symbols comprised in a data frame; and step (e) comprises:

e1) subtracting an $i^{th}$ comparison value of the (M−1) number of comparison values from the $i^{th}$ prediction value to generate an $i^{th}$ difference value; and e2) comparing a reference sequence with a sequence under test formed by the $1^{st}$ difference value to the $(M-1)^{th}$ difference value to determine whether the $1^{st}$ difference value to the $(M-1)^{th}$ difference value correspond to the synchronization segment.

9. The signal processing method according to claim 8, wherein step (e2) comprises:

performing correlation calculation on the reference sequence and the sequence under test to generate a correlation value; and determining that the $1^{st}$ symbol to the $(M-1)^{th}$ symbol of the M number of symbols correspond to the synchronization segment when the correlation value is higher than a threshold.

10. The signal processing method according to claim 7, wherein:

for the M number of symbols in another section under test, the signal processing method further generates an (M−1) number of prediction values as an (M−1) number of comparison values;

starting positions of the another section under test and the section under test are spaced by a number of symbols comprised in a data frame;

step (e) comprises:

e1) for an i value of a first part, subtracting an $i^{th}$ comparison value of the (M−1) number of comparison values from the $i^{th}$ prediction value to generate an $i^{th}$ difference value;

e2) for an i value of a second part, adding the $i^{th}$ prediction value to the $i^{th}$ comparison value to generate an $i^{th}$ summation value; and e3) comparing a reference sequence with a sequence under test formed by the plurality of difference values and the plurality of summation values to determine whether the $1^{st}$ difference value to the $(M-1)^{th}$ difference value correspond to the synchronization segment.

11. The signal processing method according to claim 10, wherein the digital broadcasting receiving system is an integrated services digital broadcasting terrestrial (ISDB-T) receiving system, and the reference sequence adopted in step (e2) exists in four types.

12. The signal processing method according to claim 10, wherein step (e2) comprises:

performing correlation calculation on the reference sequence and the sequence under test to generate a correlation value; and determining that the $1^{st}$ symbol to the $(M-1)^{th}$ symbol of the M number of symbols correspond to the synchronization segment when the correlation value is higher than a threshold.

13. The signal processing method according to claim 7, wherein step (d) comprises:

soft-combining a real part of the $(i, 1)^{th}$ differential demodulation value through a real part of the $(i, N)^{th}$ differential demodulation value to generate the $i^{th}$ prediction value.

* * * * *